Dec. 30, 1924.
F. S. BARKS ET AL
1,520,688
JOURNAL BOX FOR MINE CAR WHEELS
Filed April 17, 1922
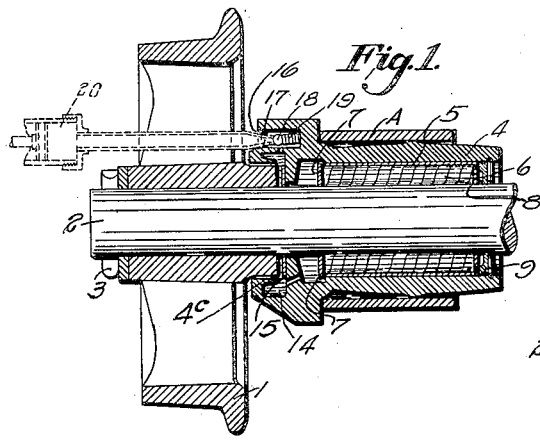
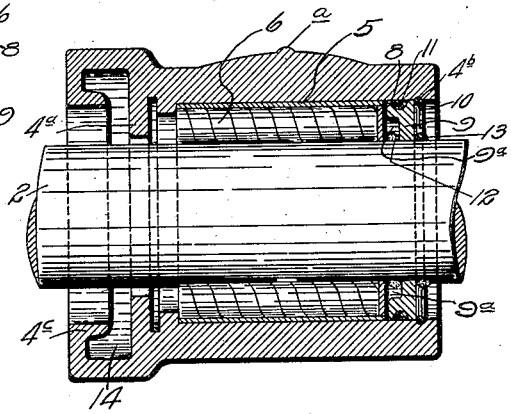
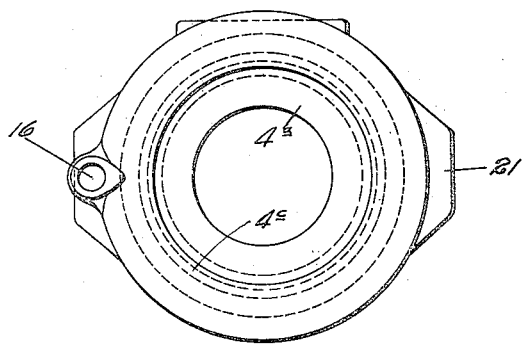
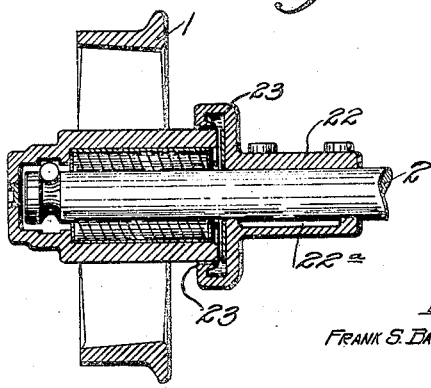
Inventors.
FRANK S. BARKS. - GEORGE B. BELL JR.
By J. R. Cornwall
Atty.

Patented Dec. 30, 1924.

1,520,688

UNITED STATES PATENT OFFICE.

FRANK S. BARKS AND GEORGE B. BELL, JR., OF ST. LOUIS, MISSOURI, ASSIGNORS TO LINCOLN STEEL AND FORGE COMPANY, OF ST. LOUIS, MISSOURI, A CORPORATION OF MISSOURI.

JOURNAL BOX FOR MINE-CAR WHEELS.

Application filed April 17, 1922. Serial No. 554,173.

*To all whom it may concern:*

Be it known that we, FRANK S. BARKS and GEORGE B. BELL, Jr., citizens of the United States, residing at city of St. Louis, State of Missouri, have invented a certain new and useful Improvement in Journal Boxes for Mine-Car Wheels, of which the following is a full, clear, and exact description, such as will enable others skilled in the art to which it appertains to make and use the same, reference being had to the accompanying drawings, forming part of this specification, in which,—

Figure 1 is a horizontal sectional view through our improved journal box showing its relation to a mine car wheel.

Figure 2 is a vertical sectional view through the outer end of the journal box.

Figure 3 is a front elevational view of said journal box, and

Figure 4 is a modified form of journal box.

Our invention relates to a new and useful improvement in journal boxes for mine car wheels, the object being to construct the box in such a manner that it can be charged with lubricant and retain said lubricant for a relatively long period of time whereby the relatively moving surfaces will be practically self-lubricated.

Due to the character of service to which the mine cars are subjected, surfaces of the journal boxes which constitute the bearings for the axle are liable to become worn in a short space of time on account of the presence of dirt and grit, and these worn surfaces permit leakage of the lubricant from the boxes. Ordinarily these journal boxes have to be recharged with a lubricant every month or so, or whenever they "run dry" and it is one of the objects of our invention to provide means whereby the lubricant is afforded an easy and unobstructed path whereby it may return to the interior of the box and not be forced out of the box, as we have observed in other types of journal boxes now on the market. It has been proposed to seal journal boxes for mine cars and while this tends to confine the lubricant within the box and exclude grit and dust from the exterior, yet, such a sealed box will also hold the finer particles of metal which are constantly sloughed from the lubricated surfaces and cause considerable wear.

In the drawings, 1 indicates a mine car wheel and 2 the axle thereof, said wheel being held on the axle by means of a cotter pin 3. 4 indicates the journal box as an entirety, which, as shown in Figures 1 to 3, is designed to be bored for a lining 5, which lining cooperates with anti-friction rollers 6 bearing directly upon the axle. 7 indicates a washer bearing against an inwardly extending flange 4ª of the box and which washer is preferably scalloped or recessed around its outer edges to permit the passage of the lubricant therebetween.

8 indicates the cage of the roller bearing which is held in position against the washer 7 by means of an end ring 9, said end ring being preferably held in place by a bent wire 10 seated in the groove 4ᵇ in the end of the journal box. The end ring 9, as shown in Figure 2, has an undercut portion in its inner face which provides a chamber 9ª at the end of the roller bearing frame 8, the overhanging or inwardly extending outer marginal flange of the end ring 9 engaging said frame member 8 to hold the roller bearing in position. The periphery of this end ring 9 is preferably formed with a semicircular recess in which is arranged hair-felt packing 11, the inner edge of the ring, while extending towards, permits the free movement of the axle within the ring.

By constructing the end ring 9 in the manner above described and providing chamber 9ª entirely around the roller frame member 8, we have found that lubricant pressed into said chamber by the action of the rollers, when the axle is rotated, will tend to pile up or be thrown outwardly as indicated at 12, in Figure 2, this piling continuing until the lubricant accumulates to such an extent that it will either run off or be thrown out of the bottom of the box within the chamber formed by the end ring and thus be held in the box so that said lubricant can again serve in lubricating the rollers. Any lubricant which leaks through the ring between the end ring and the axle outside of the box will likewise tend to build up under the action of the centrifugal force, as indicated at 13, and being exposed to air and dirt, this outside ring of lubricant becomes relatively hard so that in fact it will in a short time form a dam or obstruction tending to prevent the further escape of lubricant to the exterior.

The outer end of our improved journal box is formed with a shroud portion 4ᶜ spaced from the partition wall 4ᵃ, before referred to, so as to form an elongated surface parallel with the inner end of the hub of the wheel and slightly spaced therefrom, the inner face of said shroud being undercut to provide an enlarged reservoir 14 for the lubricant, which reservoir or chamber is located within the shroud and radially beyond, and preferably entirely around the wheel opposing surface. This chamber is closed by the hub of the wheel which may extend slightly thereinto, as shown in Figure 1, there being a washer 15 arranged in the chamber and bearing against the outer face of the partition wall 4ᵃ to take the end thrusts of the wheel hub. 16 indicates a duct or passage threaded at its outer end to receive a plug 17 against the inner face of which is normally seated a ball valve 18, said ball valve being held outwardly in position against the seat by means of a spring 19. By this arrangement, when the lubricating gun, such as indicated at 20, is used to charge the journal box with a lubricant, the ball valve may be readily unseated inwardly by the nozzle of the gun and grease injected into the journal box.

In operation, the lateral movement of the wheel and axle causes the hub which forms a wall of the chamber 14 to produce a pulsating pressure on the lubricant in chamber 14, forcing said lubricant to enter into the various communicating passages leading to the different surfaces to be lubricated. Some pressure is also exerted to force lubricant into the restricted space between the wheel hub and the opposing shroud flange. At the outer end of the passage between these opposing faces the dust always present in service combines with the grease being extruded to form a seal which effectively prevents rearward passage of the dust to bearing surfaces. The length of the passage and the slight width thereof prevents undue passage of lubricant therethrough. The lateral projection formed to accommodate the duct 16 is substantially duplicated by a solid projection 21 on the opposite side of the journal box, these two projections constituting stops for co-operating with the outer surfaces of the pedestal jaws or with the frame parts of the mine car truck frame which are provided to receive the journal box.

Another feature of our invention which we deem novel is the construction of the top bearing of the journal box which heretofore has been constructed on an arc of a circle, whereby a journal box will have swiveling or rocking contact with the frame part A resting upon it.

In our present journal box, we produce the trussed effect of the bearing by increasing the thickness of the metal in the top wall of the box from its ends toward its center, the upper surfaces of the box being described from a relatively large radius or are straight while the bearing point $a$ is in the form of a transversely disposed protuberance whose upper surface is described from a circle having a relatively small radius. In practice, we have found that in tamping the sand in the mould around the pattern where the bearing surface is formed from a single radius, sand packed more tightly on one side or at one point, would produce irregularities in the casting tending to displace the intended point of contact of the journal box with respect to the frame member either to one side or the other. By providing a protuberance described from a circle of comparatively small radius, we are able to locate the bearing point of the journal box as predetermined and at the same time preserve the strength of the box and secure the benefits of the trussed bearing.

In Figure 4, we have shown a modification of our invention in which the journal box 22 is in the form of an elongated bearing with an oil chamber 22ᵃ in its bottom. There are no roller bearings in this type of journal box, but we have shown the use of our overhanging shroud indicated here at 23, the function of this shroud being the same as that heretofore described with respect to shroud 4ᶜ.

What we claim is:

1. In a journal box, a main bearing for an axle, and a shroud adapted to cooperate with a wheel hub to form an elongated packing surface, said shroud being undercut on its inner face to provide an enlarged lubricant reservoir around the axle and hub and between the axle bearing and the outer end of said shroud.

2. In combination, an axle, a wheel having a projecting hub, a journal box, a main bearing in said journal box, a shroud on said box adapted to cooperate with said hub to form an elongated packing surface, said shroud being undercut on its inner face to provide an enlarged lubricant reservoir around said axle and hub and between said main bearing and the outer end of said shroud.

3. In combination, an axle, a journal box, a transverse partition wall therein near one end, an extension on said wall projecting laterally therefrom, a return flange on said extension parallel with and spaced from the body of said extension to form therewith an enlarged lubricant reservoir, a wheel mounted on said axle, and a hub on said wheel projecting into said box with its exterior periphery slightly spaced from the inner periphery of said flange and extending parallel therewith for a substantial distance to form a restricted elongated lubricant passage between said hub and flange.

4. In a journal box, a transverse partition wall near one end of the box, an extension on said wall projecting laterally therefrom, a return flange on said extension parallel with and spaced from the body of the extension to form therewith an enlarged lubricant reservoir and adapted to cooperate with the hub of a wheel to form an elongated lubricant contacting surface.

5. In a journal box, a roller bearing, a sleeve therefor, a box wall, the inner surface of which forms a support for said sleeve throughout its length and the upper surface of which inclines upwardly from each end toward the middle of the bearing, and a restricted pedestal or frame bearing for forming a predetermined line contact with a pedestal or frame at the highest portion of said upper surface.

6. In a journal box, a roller bearing containing recess, and a partition wall at the outer end of said recess, a horizontal projection on said wall spaced from the axle bore and having an inwardly extending flange cooperating with said projection to form a lubricant reservoir outside of said wall, and a passage through said wall to said roller bearing recess.

7. In combination, an axle, a journal box, including a roller bearing containing recess, a partition wall at the outer end of said recess and having a horizontal projection extending outwardly from the wall and spaced from the axle and provided with an inwardly extending flange adjacent to the axle and cooperating with said wall to form a lubricant reservoir outside of the wall, a wheel mounted on said axle and having a hub, the periphery of which extends parallel with and inside of said flange and forms therewith a restricted passage between them, said reservoir being open to said passage and to said axle and wheel contact.

8. The combination of the main portion of a journal box, a shroud having an oil chamber, and a communication between the shroud oil chamber and the chamber in the box, there being an inlet for the lubricant leading into said shroud chamber whereby the overflow from said shroud chamber will enter the chamber in the main portion of the box.

In testimony whereof we hereunto affix our signatures this 10th day of April, 1922.

FRANK S. BARKS.
GEORGE B. BELL, Jr.